(12) United States Patent
Bevan et al.

(10) Patent No.: US 9,222,384 B2
(45) Date of Patent: Dec. 29, 2015

(54) SCR TREATMENT OF ENGINE EXHAUST GASES USING TEMPERATURE CONTROL

(71) Applicant: JAGUAR LAND ROVER LIMITED, Warwickshire (GB)

(72) Inventors: Neil Bevan, Coventry (GB); Robert Bending, Coventry (GB); Michael Davies, Coventry (GB); Alan Jones, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/384,006

(22) PCT Filed: Mar. 12, 2013

(86) PCT No.: PCT/EP2013/055054
§ 371 (c)(1),
(2) Date: Sep. 9, 2014

(87) PCT Pub. No.: WO2013/135735
PCT Pub. Date: Sep. 19, 2013

(65) Prior Publication Data
US 2015/0027105 A1  Jan. 29, 2015

(30) Foreign Application Priority Data

Mar. 12, 2012 (GB) .................................. 1204326.1

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/08* | (2006.01) |
| *B01D 53/90* | (2006.01) |
| *B01D 53/94* | (2006.01) |
| *F02D 41/02* | (2006.01) |
| *F01N 11/00* | (2006.01) |
| *F02D 41/14* | (2006.01) |
| *F02D 41/40* | (2006.01) |

(52) U.S. Cl.
CPC .............. *F01N 3/0885* (2013.01); *B01D 53/90* (2013.01); *B01D 53/9409* (2013.01); *B01D 53/9495* (2013.01); *F01N 3/208* (2013.01); *F01N 3/2013* (2013.01); *F01N 3/2066* (2013.01); *F01N 11/002* (2013.01); *F02D 41/0235* (2013.01); *F02D 41/0245* (2013.01); *F02D 41/1446* (2013.01); *B01D 2251/2067* (2013.01); *F01N 2550/02* (2013.01); *F01N 2610/02* (2013.01);

(Continued)

(58) Field of Classification Search
USPC .................... 60/274, 277, 286, 295, 299–301
See application file for complete search history.

(56) References Cited

U.S. PATENT DOCUMENTS

| 5,785,937 A | 7/1998 | Neufert et al. |
| 2004/0098968 A1 | 5/2004 | van Nieuwstadt et al. |

(Continued)

FOREIGN PATENT DOCUMENTS

| DE | 102009044546 A1 | 5/2010 |
| EP | 2146064 A1 | 1/2010 |

OTHER PUBLICATIONS

PCT International Search Report for International application No. PCT/EP2013/055054 mailed Jun. 4, 2013.

(Continued)

*Primary Examiner* — Audrey K Bradley
*Assistant Examiner* — Dapinder Singh
(74) *Attorney, Agent, or Firm* — Carlson, Gaskey & Olds

(57) ABSTRACT

The exhaust system of an internal combustion engine is periodically dosed to recharge an SCR catalyst with ammonia. If dosing is scheduled and exhaust gas temperature is too low to ensure recharging, a forced increase in exhaust gas temperature is effected for the period of dosing. A diagnostic to confirm correct operation of a catalytic converter may advantageously run at the same time.

17 Claims, 1 Drawing Sheet

(52) U.S. Cl.
CPC ....... *F01N 2900/1602* (2013.01); *F02D 41/405* (2013.01); *Y02T 10/24* (2013.01); *Y02T 10/26* (2013.01); *Y02T 10/47* (2013.01)

(56) References Cited

U.S. PATENT DOCUMENTS

| | | | |
|---|---|---|---|
| 2007/0044456 A1 | 3/2007 | Upadhyay et al. | |
| 2007/0068139 A1 | 3/2007 | Brown et al. | |
| 2008/0271440 A1* | 11/2008 | Xu et al. | 60/295 |
| 2009/0056315 A1 | 3/2009 | Solbrig et al. | |
| 2009/0217645 A1 | 9/2009 | Sisken et al. | |
| 2009/0223207 A1 | 9/2009 | Ren | |
| 2010/0028228 A1 | 2/2010 | Gady et al. | |
| 2011/0041477 A1 | 2/2011 | Mullins et al. | |
| 2012/0023905 A1 | 2/2012 | Yezerets et al. | |

OTHER PUBLICATIONS

Combined Search and Examination Report under Sections 17 and 18(3) for Application No. GB1204326.1 dated Jul. 5, 2012.
Combined Search and Examination Report under Sections 17 and 18(3) for Application No. GB1304436.7 dated Aug. 30, 2013.

* cited by examiner

SCR TREATMENT OF ENGINE EXHAUST GASES USING TEMPERATURE CONTROL

FIELD OF THE INVENTION

The invention relates to treatment of exhaust emissions of internal combustion engines, and particularly to engine exhaust systems incorporating selective catalytic reduction. Aspects of the invention relate to a method, to an engine and to a vehicle.

BACKGROUND

Legislation requires that noxious emissions of internal combustion engines be treated. Selective catalytic reduction (SCR) uses ammonia as a reducing agent to turn nitrogen oxides ($NO_x$) into nitrogen and water. Typically urea is injected periodically into the engine exhaust system upstream of an SCR chamber, where it mixes with hot exhaust gas to produce ammonia. This ammonia is absorbed onto the SCR catalyst in the chamber, and is effective at treating $NO_x$. Over time the ammonia becomes depleted and a further injection of urea is required to recharge the catalyst. Depletion is estimated, usually in an engine management system, by monitoring engine activity over time. Systems for producing an injecting ammonia are also known.

An SCR catalyst is usually relatively remote from the engine; in a diesel engine it is for example downstream of the usual diesel oxidation catalyst (DOC) and diesel particle filter (DPF). As a consequence exhaust gas passing through the SCR chamber is often relatively cool, especially in city driving where vehicle speeds are low.

At low exhaust gas temperatures, thermal decomposition of urea to ammonia does not take place, and accordingly urea injection is inhibited by a control system. Such inhibition avoids formation of solid deposits in the chamber, and wastage of urea, but inevitably prolonged city driving may eventually result in a fully depleted catalyst. In the case of ammonia injection, deposits may also form at low exhaust gas temperatures.

It is against this background that the present invention has been conceived. Embodiments of the invention may provide an improved method or apparatus for treating exhaust emissions. Other aims and advantages of the invention will become apparent from the following description, claims and drawings.

SUMMARY

According to at least one embodiment of the invention there is provided a method of recharging an SCR catalyst of a vehicle exhaust system comprising the steps of determining that recharging of the SCR catalyst is scheduled, determining whether the temperature of the SCR catalyst is at or above a threshold; if yes, recharging the SCR catalyst from an external source, if no; raising the temperature of the exhaust gas to said threshold and recharging the SCR catalyst at said temperature from the external source.

In one embodiment of the invention there is provided a method of injecting urea into the exhaust gas stream of an internal combustion engine, comprising determining that an urea injection is scheduled, determining whether the temperature of an SCR catalyst is at or above a threshold; if yes, injecting a dose of urea; if no, raising the temperature of exhaust gas to said threshold and injecting a dose of urea at the raised temperature.

According to a further aspect of the invention there is provided a method of recharging an SCR catalyst of a vehicle exhaust system comprising the steps of determining that recharging of the SCR catalyst is scheduled, determining whether the temperature of the SCR catalyst is at or below a threshold, if no, recharging the SCR catalyst from an external source, if yes, raising the temperature of the exhaust gas to said threshold and recharging the SCR catalyst at said temperature from the external source.

In one embodiment of the invention there is provided a method of injecting urea into the exhaust gas stream of an internal combustion engine, comprising determining that a urea injection is scheduled, determining whether the temperature of an SCR catalyst is at or below a threshold; if no, injecting a dose of urea; if yes, raising the temperature of said catalyst to said threshold and injecting a dose of urea at the raised temperature.

The temperature of the SCR catalyst may be interpolated from exhaust gas temperature upstream thereof.

Embodiments of the invention therefore provide for the temperature of a cool exhaust gas stream to be raised sufficiently to ensure effective conversion of urea to ammonia, for the purpose of recharging the SCR catalyst. Continuous treatment of $NO_x$ is thereby assured, even if the vehicle operating conditions tend towards low production of power and torque, such as in low speed city driving.

Furthermore, exhaust gas temperature may be raised by any suitable method. The engine operating map may be changed to cause the engine to work harder and thereby directly raise exhaust gas temperature, or electric heating may be provided in the exhaust tract to indirectly raise exhaust gas temperature. Alternatively a small amount of fuel is injected into the exhaust gas stream, and is burnt in the catalytic converter (e.g. the DOC); this raises exhaust gas temperature sufficiently to permit effective decomposition of urea.

One or more sensors may be provided to directly measure exhaust gas temperature at one or more locations of the exhaust tract. The outputs of such sensors may directly indicate the temperature of the SCR catalyst, or permit catalyst temperature to be interpolated or modelled from temperature measurement(s) made elsewhere.

After injection of urea, the vehicle engine may revert to normal operation, and the special measures to increase catalyst temperature are ceased. If the temperature of the SCR catalyst is raised by a different mode of driving, the special measures are also ceased.

In another embodiment ammonia may be directly injected into the exhaust gas stream.

A feature of legislation for treatment of engine exhaust emissions is that a periodic diagnostic is required to confirm that treatment is effective—in one example confirmation is required that a catalyst is working, and if not a malfunction signal is generated for the vehicle driver. If the exhaust gas stream is cool such a diagnostic may not be effective, with the result that a malfunction signal may be inappropriately generated. An advantage of the invention is that by raising exhaust gas temperature at the time of urea injection, the diagnostic can work effectively. Thus an embodiment of the invention includes the step of running such a diagnostic at the same time as gas temperature is raised for urea injection.

In an embodiment of the invention the diagnostic is for the DOC and comprises increasing the DOC temperature by post-combustion injection to cause an exothermic reaction therein, and confirming that the increase in DOC temperature meets or exceeds a pre-determined value. The advantage of this arrangement is that a single instance of raised exhaust gas temperature may be used both to ensure effective injection of urea for the recharging SCR, and for running the periodic diagnostic.

Within the scope of this application it is expressly intended that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF DRAWINGS

Embodiments of the present invention will now be described, by way of example only, with reference to the accompanying drawings, in which.

DETAILED DESCRIPTION

Figure 1:
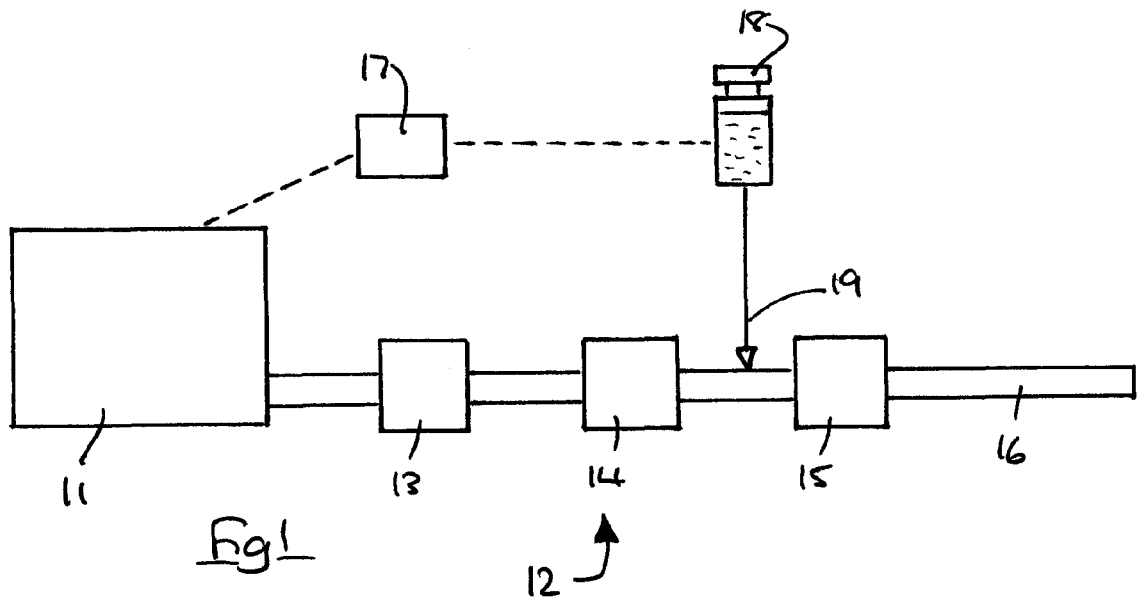
FIG. 1 is a schematic representation of an exhaust system of a diesel engine with urea dosing of the exhaust stream.

With reference to FIG. 1, a diesel internal combustion engine 11 has an exhaust tract, or system, 12 incorporating a diesel oxidation catalyst (DOC) 13, a diesel particle filter (DPF) 14, and a catalyst 15 for selective catalytic reduction. The exhaust tract terminates in an open tail pipe 16.

An engine management system (EMS) 17 electronically controls operation of the engine, in particular fuelling thereof, according to programmed information, real time monitoring and driver demand. Such an engine management system is well known and need be not further described here.

A container 18 of liquid urea is provided for periodically dosing the exhaust tract, under the control of the EMS 17 as represented by arrow 19; as noted above urea mixes with exhaust gas to produce ammonia, with which to recharge the SCR catalyst. The mixing occurs in a region of the exhaust tract where the urea is provided, which is herein referred to as the recharging region. This region is upstream of the catalyst 15 but may encompass the catalyst. Systems for dosing urea into exhaust systems are well known, and need not be further described here. It should also be noted that urea is only an example of a thermally decomposable substance suitable for recharging the catalyst, and the use of other thermally decomposable substances is within the scope of the present invention.

Figure 2:
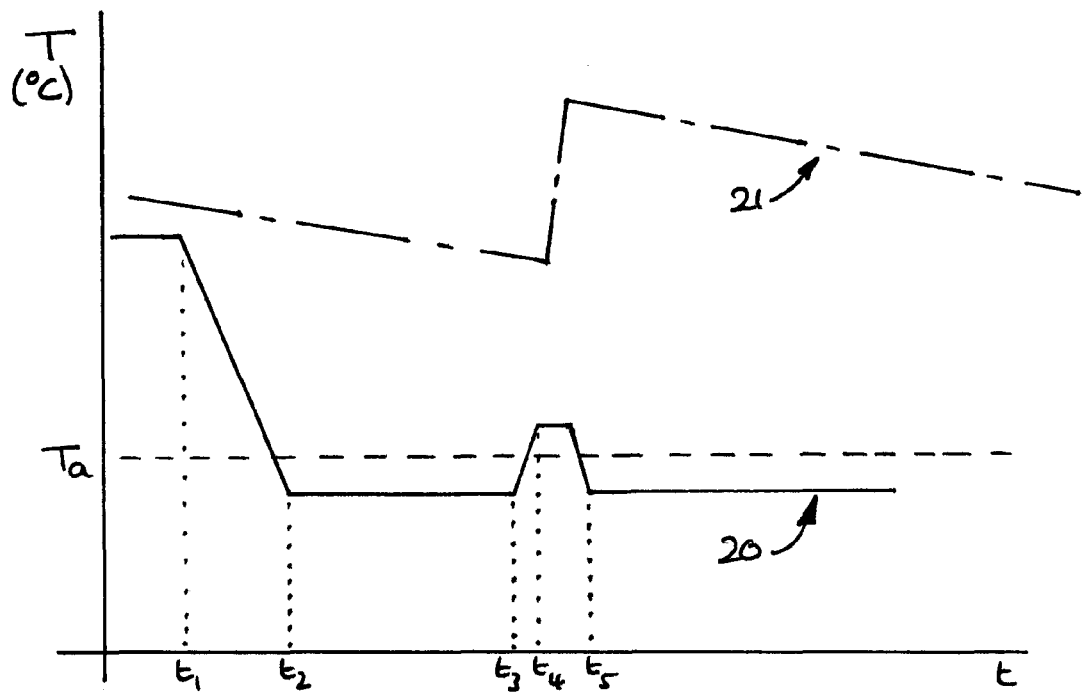
FIG. 2 illustrates graphically the effect of an embodiment of the invention.

FIG. 2 represents temperature (T) of the SCR over time (t). The temperature 20 may be sensed directly by a suitable sensor of the exhaust tract, or may be interpolated from sensors elsewhere in the exhaust tract, or may be calculated by the EMS 17 according to an algorithm, or other data relating to instant or cumulative engine performance.

In the invention the temperature of the SCR catalyst brick is determinative, but it will be appreciated that this temperature is very strongly influenced by exhaust gas temperature.

Exhaust gas temperature varies according to how hard the engine is worked. At time $t_1$, gas temperature is high and consistent for example with highway driving. At time $t_2$ gas temperature is relatively low, and consistent with low speed city driving. A threshold temperature $T_a$ indicates the minimum temperature necessary for thermal decomposition of urea to ammonia, and is around 170° C., or 180° C. Temperatures below the threshold temperature $T_a$ therefore lie in a first range of temperatures where the urea cannot thermally decompose. Accordingly, temperatures above the threshold temperature $T_a$ therefore lie in a second range of temperatures where the urea can thermally decompose.

At time $t_3$, an injection of urea is scheduled due to depletion of ammonia on the SCR catalyst. Depletion, and hence injection, can be determined conventionally by any suitable method, but is typically calculated by the EMS 17 from continuous monitoring of engine operating condition.

Injection of urea is however inhibited at $t_3$ because gas temperature is below $T_a$. Conventionally inhibition would continue until conditions of vehicle use changed to permit exhaust gas temperature to rise above $T_a$.

According to one embodiment of the invention a forced increased of engine exhaust gas temperature is initiated to elevate the temperature above the threshold $T_a$ and thus into the second range so that at $t_4$ injection of urea may occur with the certainty of thermal decomposition to ammonia. Hence the SCR catalyst may be recharged so as to effectively treat $NO_x$. The dose of urea is governed by the size and nature of the SCR catalyst and the degree of depletion thereof; this dose can be determined conventionally.

As soon as the SCR catalyst has been sufficiently recharged, the engine reverts to normal operation, and for city driving the gas temperature may revert to less than $T_a$, as indicated at $t_5$.

Ammonia content of the SCR catalyst is schematically indicated by chain-dot line 21, and show gradual depletion until $t_4$, an increase as a result of injection of urea, and then gradual depletion. The characteristics of FIG. 2 are somewhat exaggerated in order to illustrate the effect of the invention and the shape thereof may in practice not follow straight lines.

The alternative of injection of ammonia may be inhibited below a temperature of about 120° C. so as to avoid the formation of deposits within the SCR.

The invention claimed is:

1. A method of recharging a reducing agent of an SCR catalyst of an exhaust system for an internal combustion engine, the method comprising:
   determining that recharging of the SCR catalyst is required;
   periodically injecting a thermally decomposable substance into the exhaust system;
   determining whether the temperature of exhaust gas in a recharging region of the exhaust system is in a first range or a second range above the first range, wherein in the first range the substance cannot thermally decompose and in the second range the substance can thermally decompose;
   inhibiting injection of the thermally decomposable substance based upon a determination that recharging of the SCR catalyst is not required and that the temperature is in either the first range or the second range;
   injecting the thermally decomposable substance into or upstream of the recharging region to recharge the SCR catalyst based upon a determination that recharging of the SCR catalyst is required and that the temperature of the exhaust gas in the recharging region is in the second range; and
   raising the temperature of the exhaust gas in the recharging region into the second range based upon a determination that recharging of the catalyst is required and that the temperature of the exhaust gas in the recharging region is in the first range, and injecting the thermally decomposable substance into or upstream of the recharging region to recharge the SCR catalyst when the temperature is raised sufficiently to be in the second range.

2. A method according to claim 1, comprising raising the temperature of the exhaust gas in the recharging region by adjusting engine operation, wherein adjusting the engine operation comprises at least one of:
post-combustion fuel injection; or
modifying combustion conditions within the engine.

3. A method according to claim 1, wherein the temperature of the exhaust gas in the recharging region is interpolated from one or more temperature sensors downstream of the SCR catalyst.

4. A method according to claim 1, wherein the temperature of the exhaust gas in the recharging region is calculated by reference to combustion conditions of the internal combustion engine.

5. A method according to claim 1, wherein the requirement to recharge the SCR catalyst is determined by reference to a combustion history of the internal combustion engine.

6. A method according to claim 1, wherein the recharging region is upstream of the SCR catalyst.

7. A method according to claim 1, wherein the SCR catalyst is inside the recharging region which extends upstream of the SCR catalyst.

8. A method according to claim 1, comprising reverting to normal engine operation to thereby reduce the temperature of the exhaust gas in the recharging region into the first range after the SCR catalyst is recharged.

9. A method according to claim 8, wherein the temperature of the exhaust gas in the recharging region reverts, after the SCR catalyst is recharged, to the temperature of the exhaust gas in the recharging region before the temperature of the exhaust gas in the recharging region was raised.

10. A method according to claim 1, wherein the temperature of the exhaust gas in the recharging region remains in the second range during recharging.

11. A method according to claim 10, wherein the temperature of the exhaust gas in the recharging region is substantially constant during recharging.

12. A method according to claim 1, wherein the temperature of the exhaust gas in the recharging region is interpolated from one or more temperature sensors upstream of the SCR catalyst.

13. A method according to claim 12, wherein the at least one of the one or more temperature sensors is immediately upstream of the SCR catalyst.

14. A method according to claim 1, further comprising the step of performing an exhaust gas treatment diagnostic while the temperature of the exhaust gas in the recharging region is in the second range.

15. A method according to claim 14, wherein the exhaust gas treatment diagnostic comprises post-combustion injection of fuel to cause an exothermic reaction within a catalytic converter, and confirming that the reaction results in a predetermined rise in temperature within the catalytic converter.

16. An exhaust system for connection to an internal combustion engine, the exhaust system comprising:
an SCR catalyst;
a recharging region;
a source of a thermally decomposable substance; and
a controller that is configured to control whether the thermally decomposable substance is introduced into said exhaust system upstream of the SCR catalyst, the controller being configured to
determine whether recharging the SCR catalyst is desired;
inhibit injection of the thermally decomposable substance based upon a determination that recharging of the SCR catalyst is not required;
periodically inject the thermally decomposable substance into the exhaust system;
determine a temperature of exhaust gas in the recharging region of the exhaust system;
increase the temperature of the exhaust gas in the recharging region if the determined temperature is too low for the thermally decomposable substance to decompose to recharge the SCR catalyst based upon a determination that recharging the SCR catalyst is desired; and
inject the urea into or upstream of the recharging region to recharge the SCR catalyst when the temperature of the exhaust gas in the recharging region is hot enough for the thermally decomposable substance to decompose to recharge the SCR catalyst based upon a determination that recharging the SCR catalyst is desired.

17. A motor vehicle comprising:
an internal combustion engine; and
an exhaust system associated with the engine, the exhaust system comprising:
an SCR catalyst;
a recharging region;
a source of a thermally decomposable substance; and
a controller that is configured to control whether the thermally decomposable substance is introduced into said exhaust system upstream of the SCR catalyst, the controller being configured to
determine whether recharging the SCR catalyst is desired;
inhibit injection of the thermally decomposable substance based upon a determination that recharging of the SCR catalyst is not required;
periodically inject the thermally decomposable substance into the exhaust system;
determine a temperature of exhaust gas in the recharging region of the exhaust system;
increase the temperature of the exhaust gas in the recharging region if the determined temperature is too low for the thermally decomposable substance to decompose to recharge the SCR catalyst based upon a determination that recharging the SCR catalyst is desired; and
inject the urea into or upstream of the recharging region to recharge the SCR catalyst when the temperature of the exhaust gas in the recharging region is hot enough for the thermally decomposable substance to decompose to recharge the SCR catalyst based upon a determination that recharging the SCR catalyst is desired.

* * * * *